(12) United States Patent  
Chaudhry et al.

(10) Patent No.: US 7,152,232 B2  
(45) Date of Patent: Dec. 19, 2006

(54) HARDWARE MESSAGE BUFFER FOR SUPPORTING INTER-PROCESSOR COMMUNICATION

(75) Inventors: Shailender Chaudhry, San Francisco, CA (US); Marc Tremblay, Menlo Park, CA (US)

(73) Assignee: Sun Microsystems, Inc., Santa Clara, CA (US)

( * ) Notice: Subject to any disclaimer, the term of this patent is extended or adjusted under 35 U.S.C. 154(b) by 679 days.

(21) Appl. No.: 10/194,856

(22) Filed: Jul. 12, 2002

(65) Prior Publication Data

US 2003/0056020 A1    Mar. 20, 2003

Related U.S. Application Data

(60) Provisional application No. 60/305,942, filed on Jul. 16, 2001.

(51) Int. Cl.  
*G06F 9/46* (2006.01)

(52) U.S. Cl. .................. 719/314; 719/310; 719/313; 711/138

(58) Field of Classification Search ............... 718/106; 719/310, 314, 313; 711/1, 3, 113, 118, 138  
See application file for complete search history.

(56) References Cited

U.S. PATENT DOCUMENTS

| | | | | |
|---|---|---|---|---|
| 5,434,975 A | * | 7/1995 | Allen | ......................... 719/312 |
| 5,617,537 A | * | 4/1997 | Yamada et al. | ............. 709/214 |
| 5,924,097 A | * | 7/1999 | Hill et al. | ....................... 707/10 |
| 5,940,877 A | * | 8/1999 | Eickemeyer et al. | ........ 711/220 |
| 6,047,391 A | * | 4/2000 | Younis et al. | ................. 714/47 |
| 6,105,108 A | * | 8/2000 | Steely, Jr. et al. | .......... 711/118 |
| 6,282,578 B1 | * | 8/2001 | Aizono et al. | ............. 719/310 |
| 6,314,478 B1 | * | 11/2001 | Etcheverry | .................... 710/29 |
| 6,430,646 B1 | * | 8/2002 | Thusoo et al. | .............. 710/305 |
| 6,668,275 B1 | * | 12/2003 | Alsup et al. | ................. 709/208 |
| 6,714,961 B1 | * | 3/2004 | Holmberg et al. | .......... 718/106 |
| 6,799,317 B1 | * | 9/2004 | Heywood et al. | ........... 719/313 |
| 6,813,522 B1 | * | 11/2004 | Schwarm et al. | ............... 700/5 |
| 6,862,595 B1 | * | 3/2005 | Elko et al. | .................... 707/10 |

OTHER PUBLICATIONS

Article entitled "The MAJC Architecture: A Synthesis of Parallelism and Scalability," by Marc Tremblay et al., IEEE Micro, Nov./Dec. 2000, pp. 12-25.

* cited by examiner

*Primary Examiner*—William Thomson  
*Assistant Examiner*—Andy Ho  
(74) *Attorney, Agent, or Firm*—Park, Vaughan & Fleming LLP (57) ABSTRACT

One embodiment of the present invention provides a system that facilitates inter-processor communication and synchronization through a hardware message buffer, which includes a plurality of physical channels that are structured as queues for communicating between processors in a multiprocessor system. The system operates by receiving an instruction to perform a data transfer operation through the hardware message buffer, wherein the instruction specifies a virtual channel to which the data transfer operation is directed. Next, the system translates the virtual channel into a physical channel, and then performs the data transfer operation on the physical channel within the hardware message buffer. In one embodiment of the present invention, if the data transfer operation is a store operation and the physical channel is already full, the system returns status information indicating that the physical channel is too full to perform the store operation. In one embodiment of the present invention, if the data transfer operation is a load operation and the physical channel is empty, the system returns status information indicating that the physical channel is empty and the load operation cannot be completed.

33 Claims, 4 Drawing Sheets

HARDWARE MESSAGE BUFFER FOR SUPPORTING INTER-PROCESSOR COMMUNICATION

RELATED APPLICATION

This application hereby claims priority under 35 U.S.C. §119 to U.S. Provisional Patent Application No. 60/305,942, filed on Jul. 16, 2001, entitled "Hardware Message Buffer for Supporting Inter-processor Communication," by inventors Shailender Chaudhry and Marc Tremblay.

BACKGROUND

1. Field of the Invention

The present invention relates the design of multiprocessor systems. More specifically, the present invention relates to a method and an apparatus that facilitates inter-processor communication and synchronization through a hardware message buffer.

2. Related Art

As increasing semiconductor integration densities allow more transistors to be integrated onto a microprocessor chip, computer designers are investigating different methods of using these transistors to increase computer system performance. Some computer designers have begun to incorporate multiple processors into a single microprocessor chip. This can potentially speed up the execution of computational tasks by allowing a given computational task to be divided into sub-tasks that can be performed by multiple processors executing in parallel. Furthermore, by locating the processors on the same semiconductor chip, the performance-limiting effects of inter-processor communication delays can be significantly reduced.

Thus, multiple processors within a single semiconductor chip can be used to perform multi-threaded applications, wherein the multiple processors execute threads that operate on independent subtasks of a workload. However, many computational tasks cannot be efficiently partitioned into independent subtasks because of data dependencies.

For example, some loops can be parallelized by performing loop unrolling and software pipelining. In this way, a first processor can work on a given iteration of a loop while a second processor works on a subsequent iteration of the loop. However, data dependencies can cause synchronization problems because a given loop iteration may write to a data value that is used in a subsequent loop iteration. Hence, the subsequent loop iteration cannot proceed until the given loop iteration performs the write operation.

These dependencies can be handled by synchronizing processors through inter-processor locks or memory barriers. However, using inter-processor locks or memory barriers can be prohibitively expensive because they often require different processor structures, such as load queues and store queues, to be flushed. Furthermore, the process of acquiring a lock variable may involve expensive cache coherence operations. Note that the overhead of using locks or memory barriers may be acceptable in loosely coupled parallel tasks that use locks infrequently. However, for more tightly coupled parallel applications, with more frequent data dependencies, the cost of using locks or memory barriers can largely mitigate the performance benefits derived from parallel execution.

What is needed is a method and an apparatus that facilitates inter-processor communication and synchronization without the performance problems associated with using locks or memory barriers.

SUMMARY

One embodiment of the present invention provides a system that facilitates inter-processor communication and synchronization through a hardware message buffer, which includes a plurality of physical channels that are structured as queues for communicating between processors in a multiprocessor system. The system operates by receiving an instruction to perform a data transfer operation through the hardware message buffer, wherein the instruction specifies a virtual channel to which the data transfer operation is directed. Next, the system translates the virtual channel into a physical channel, and then performs the data transfer operation on the physical channel within the hardware message buffer.

In one embodiment of the present invention, if the data transfer operation is a store operation and the physical channel is already full, the system returns status information indicating that the physical channel is too full to perform the store operation.

In one embodiment of the present invention, if the data transfer operation is a load operation and the physical channel is empty, the system returns status information indicating that the physical channel is empty and the load operation cannot be completed.

In one embodiment of the present invention, if the data transfer operation is a load operation and the physical channel is not empty, the system performs the data transfer operation by returning data from the physical channel.

In one embodiment of the present invention, the hardware message buffer resides within a shared memory that is located outside of a coherent address space of the multiprocessor system.

In one embodiment of the present invention, translating the virtual channel into a physical channel involves performing a lookup into a translation table that specifies virtual channel-to-physical channel translations.

In one embodiment of the present invention, each entry in the translation table includes: a process/thread identifier; a virtual channel identifier; a physical channel identifier; and a read/write permission indicator.

In one embodiment of the present invention, each entry in the translation table additionally specifies a number of read operations that must take place before a read pointer is moved, whereby a physical channel can be used to transfer data from a single sender to multiple receivers.

In one embodiment of the present invention, the translation table is a hardware structure that caches entries for recently used virtual channel-to-physical channel translations. In this embodiment, less recently used entries are moved from the translation table into memory if necessary.

In one embodiment of the present invention, each physical channel in the hardware message buffer is structured as a queue and includes a read pointer and write pointer.

BRIEF DESCRIPTION OF THE FIGURES

Table 1 illustrates and example benchmark program.

Table 2 illustrates parallelized code for a producer process in accordance with an embodiment of the present invention.

Table 3 illustrates parallelized code for a consumer process in accordance with an embodiment of the present invention.

DETAILED DESCRIPTION

The following description is presented to enable any person skilled in the art to make and use the invention, and is provided in the context of a particular application and its requirements. Various modifications to the disclosed embodiments will be readily apparent to those skilled in the art, and the general principles defined herein may be applied to other embodiments and applications without departing from the spirit and scope of the present invention. Thus, the present invention is not intended to be limited to the embodiments shown, but is to be accorded the widest scope consistent with the principles and features disclosed herein.

The data structures and code described in this detailed description are typically stored on a computer readable storage medium, which may be any device or medium that can store code and/or data for use by a computer system. This includes, but is not limited to, magnetic and optical storage devices such as disk drives, magnetic tape, CDs (compact discs) and DVDs (digital versatile discs or digital video discs).

Multiprocessor System

Figure 1:
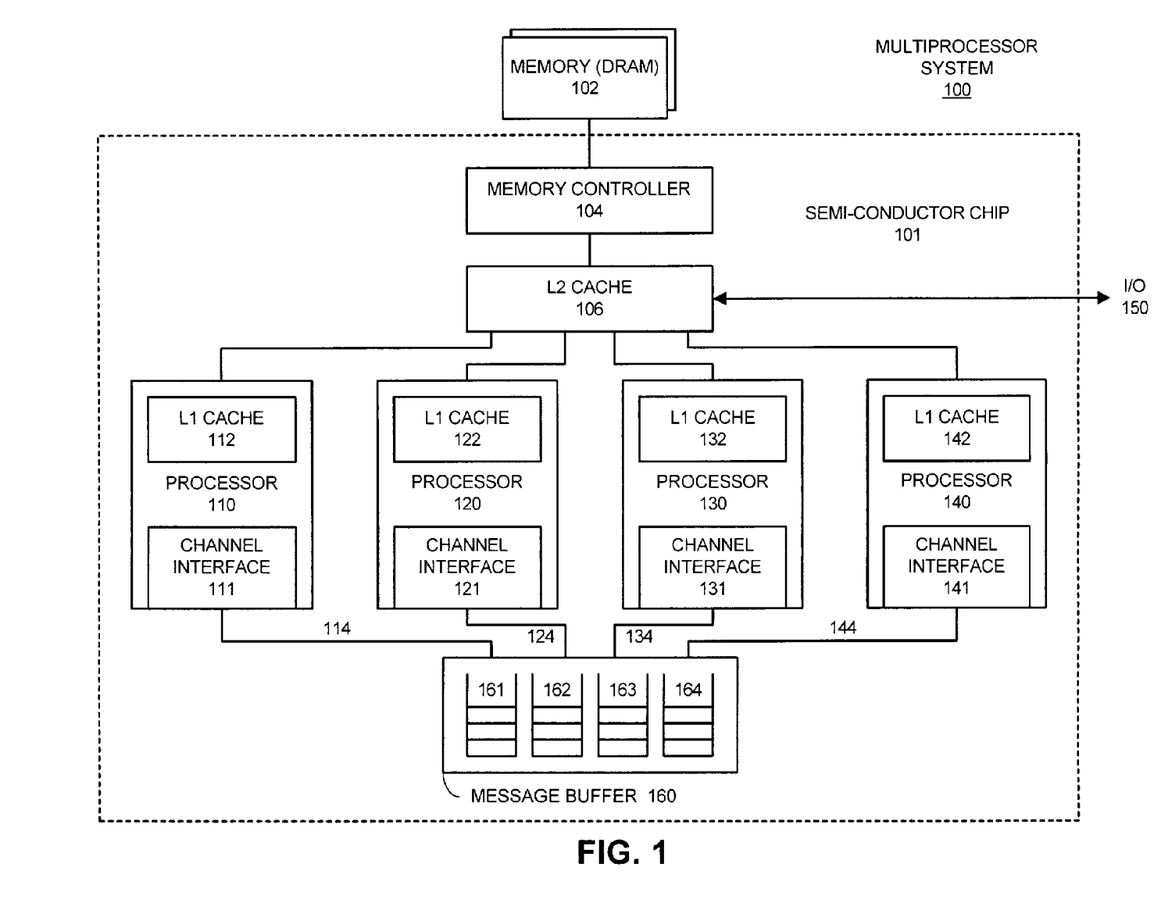
FIG. 1 illustrates a multiprocessor system in accordance with an embodiment of the present invention.

FIG. 1 illustrates a multiprocessor system 100 including a hardware message buffer 160 in accordance with an embodiment of the present invention.

Note much of multiprocessor system 100 is located within a single semiconductor chip 101. More specifically, semiconductor chip 101 includes a number of processors 110, 120, 130 and 140, which contain level one (L1) caches 112, 122, 132 and 142, respectively. Note that the L1 caches 112, 122, 132 and 142 may be separate instruction and data caches, or alternatively, unified instruction/data caches. L1 caches 112, 122, 132 and 142 are coupled to level two (L2) cache 106. L2 cache 106 is coupled to off-chip memory 102 through memory controller 104.

In one embodiment of the present invention, L1 caches 112, 122, 132 and 142 are write-through caches, which means that all updates to L1 caches 112, 122, 132 and 142 are automatically propagated to L2 cache 106. This simplifies the coherence protocol, because if processor 110 requires a data item that is present in L1 cache 112, processor 110 can receive the data from L2 cache 106 without having to wait for L1 cache 112 to source the data.

Processor 110, 120, 130 and 140 can communicate with each other by performing read and write accesses to shared memory 102. However, because of the cache coherence protocol, these read and write accesses the shared memory 102 can be very slow.

Figure 3:
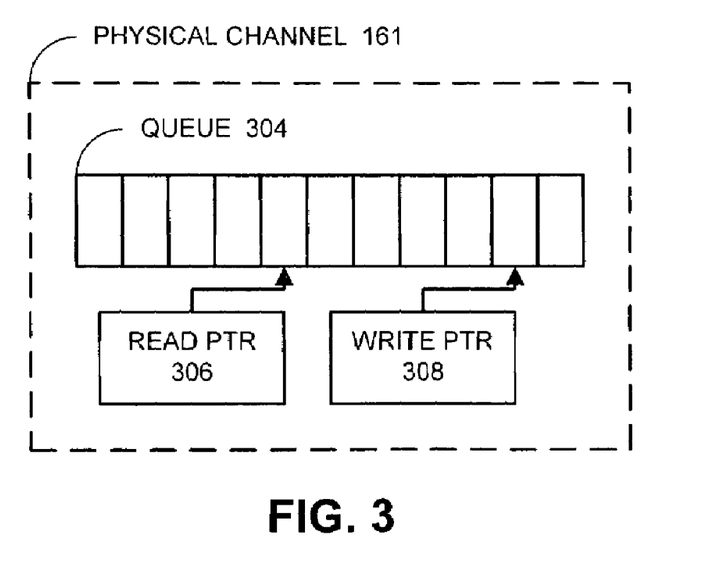
FIG. 3 illustrates a physical channel in accordance with an embodiment of the present invention.

Alternatively, processors 110, 120, 130 and 140 can communicate with each other through message buffer 160. Note that message buffer 160 resides outside of the coherent address space of shared memory 102. Hence, accesses to message buffer 160 do not trigger the cache coherence protocol. Message buffer 160 includes a number of physical channels 161–164 through which the processors communicate. Note that these physical channels are implemented as queues. For example, as illustrated in FIG. 3, physical channel 161 includes a queue 304 for storing data, as well as a read pointer 306 and a write pointer 308.

Referring back to FIG. 1, note that message buffer 160 communicates with processors 110, 120, 130 and 140 though pathways 114, 124, 134 and 144. In order to support this communication, message buffer 160 may include a switch (not shown) for switching pathways 114, 124, 134 and 144 to a memory that contains physical channels 161–164. Note that in order to support parallel accesses to message buffer 160, message buffer 160 can be implemented as a banked memory or multi-ported memory.

Processors 110, 120, 130 and 140 communicate with message buffer 160 through channel interfaces 111, 121, 131 and 141, respectively. Channel interfaces 111, 121, 131 and 141 translate virtual channel identifiers, specified in program instructions, into identifiers for physical channels within message buffer 160. This allows the program code to be written in terms of virtual channels that are mapped to whatever physical channels are available at run time. This mapping process is described in more detail below with reference to FIGS. 2–6.

Channel Interface

Figure 2:
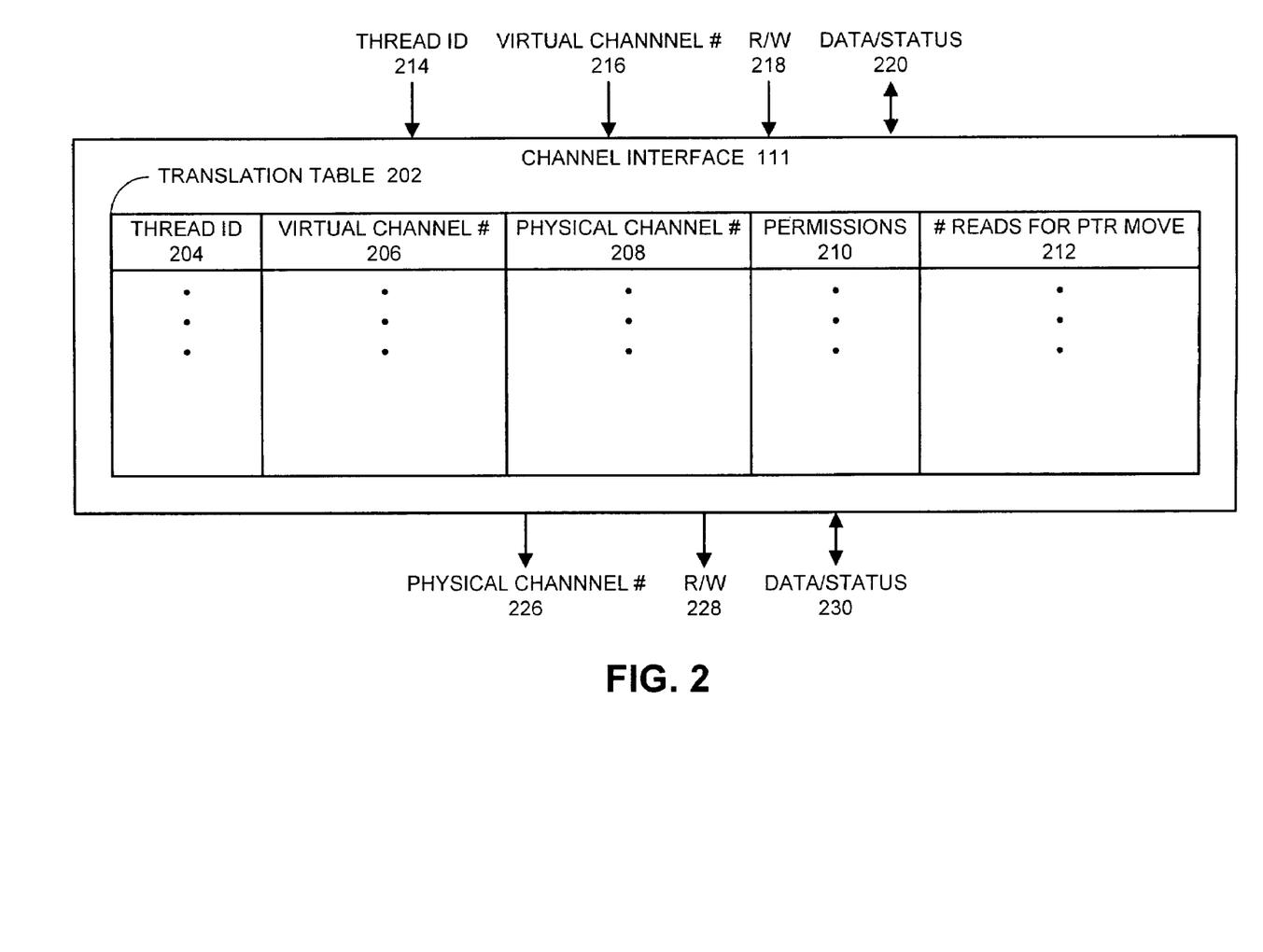
FIG. 2 illustrates a channel interface in accordance with an embodiment of the present invention.

FIG. 2 illustrates the structure of channel interface 111 in accordance with an embodiment of the present invention. Channel interface 111 uses translation table 122 to perform a translation between virtual channel identifiers, specified in program instructions, and identifiers for physical channels within message buffer 160.

More specifically, channel interface 111 receives a number of signals from processor 110, including, thread identifier 214, virtual channel number 216, read/write indicator 218 and data/status word 220. Thread identifier 214 identifies a thread or a process/context that is accessing message buffer 160. Virtual channel number 216 identifies a virtual channel to which the access is directed. Read/write indicator 218 specifies whether the access is a read (load) or a write (store) operation to the virtual channel. Finally, data/status word 220 contains the data to be written to or read from the virtual channel, and can possibly contain status information as is described below with reference to FIG. 5.

Channel interface 111 forwards a number of signals to message buffer 160, including physical channel number 226, read/write indicator 228 and data/status word 230. Physical channel number 226 specifies the physical channel in message buffer 160 to which the access is directed. Read/write indicator 228 specifies whether the access is a read operation or a write operation to the physical channel. Finally, data/status word 230 contains the data to be written to or read from the physical channel, and can possible contain status information.

Translation table 202 includes a number of entries. Each of these entries contain a number of fields, including thread identifier 204, virtual channel number 206, physical channel number 208, permissions field 210 and number of reads for pointer move 212. Thread identifier 214 identifies a specific thread or process/context. For this thread, virtual channel number 206 identifies a virtual channel and physical channel number 208 identifies a physical channel to which the virtual channel is mapped. Permissions field 210 indicates whether the thread has read and/or write permission on the physical channel. Finally, the number of reads for a pointer move 212 indicates how many times a queue must be read from in order for the read pointer to be advanced. This feature facilitates sending a data item from a single sender to multiple receivers.

In one embodiment of the present invention, translation table 202 is implemented as a translation lookaside buffer for recently used virtual channel-to-physical channel translations. In this embodiment, less recently used translations are migrated to memory.

Instruction Format

Figure 4:
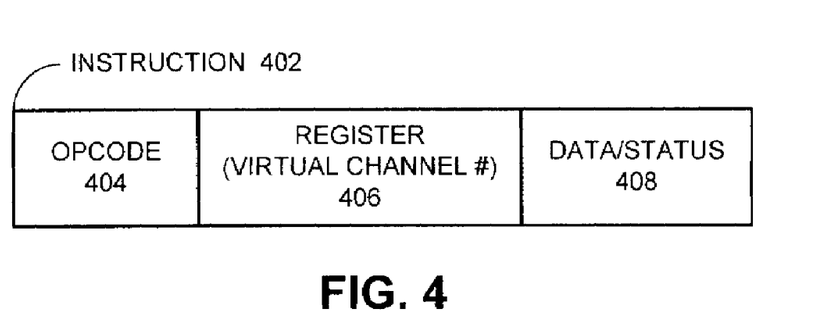
FIG. 4 illustrates the format of an instruction that accesses the message buffer in accordance with an embodiment of the present invention.

FIG. 4 illustrates the format of an instruction 402 that accesses message buffer 160 in accordance with an embodiment of the present invention. Instruction 402 includes a number of fields, including opcode 404, register (virtual channel) 406 and data/status field 408. Opcode 404 specifies whether the operation is a load (read) operation or a store (write) operation. Register (virtual channel) 406 identifies a virtual channel that the operation is directed to. Note that the virtual channel is referenced in the same way as a register is. Hence, load and store operations involving virtual channels are programmed in the same way as load and store operations involving registers. Data/status field 408 identifies the location of (or contains) the data/status word involved in the operation.

Data Word Format

Figure 5:
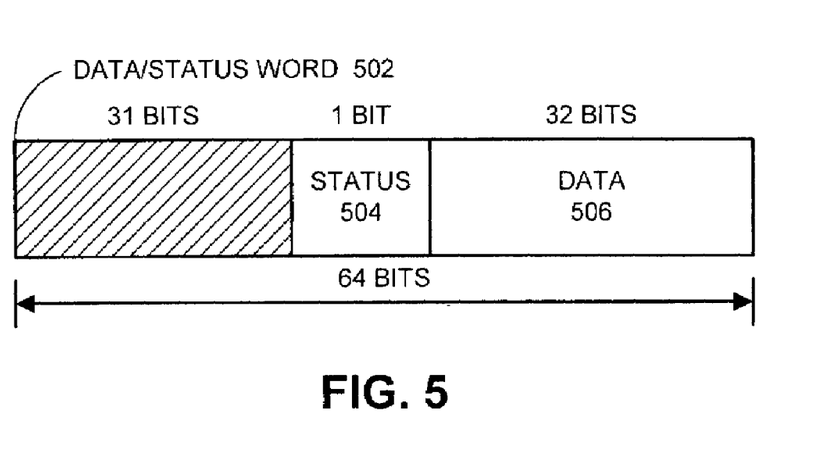
FIG. 5 illustrates the format of a data/status word returned by the message buffer in accordance with an embodiment of the present invention.

FIG. 5 illustrates the format of a data/status word 502 returned by or sent to message buffer 160 in accordance with an embodiment of the present invention. Data/status word 502 is a 64-bit data word that contains a 32-bit data portion 506, and a single bit for status information 504. The remaining 31 bits of data/status word 502 are unused.

Process of Accessing the Hardware Message Buffer

Figure 6:
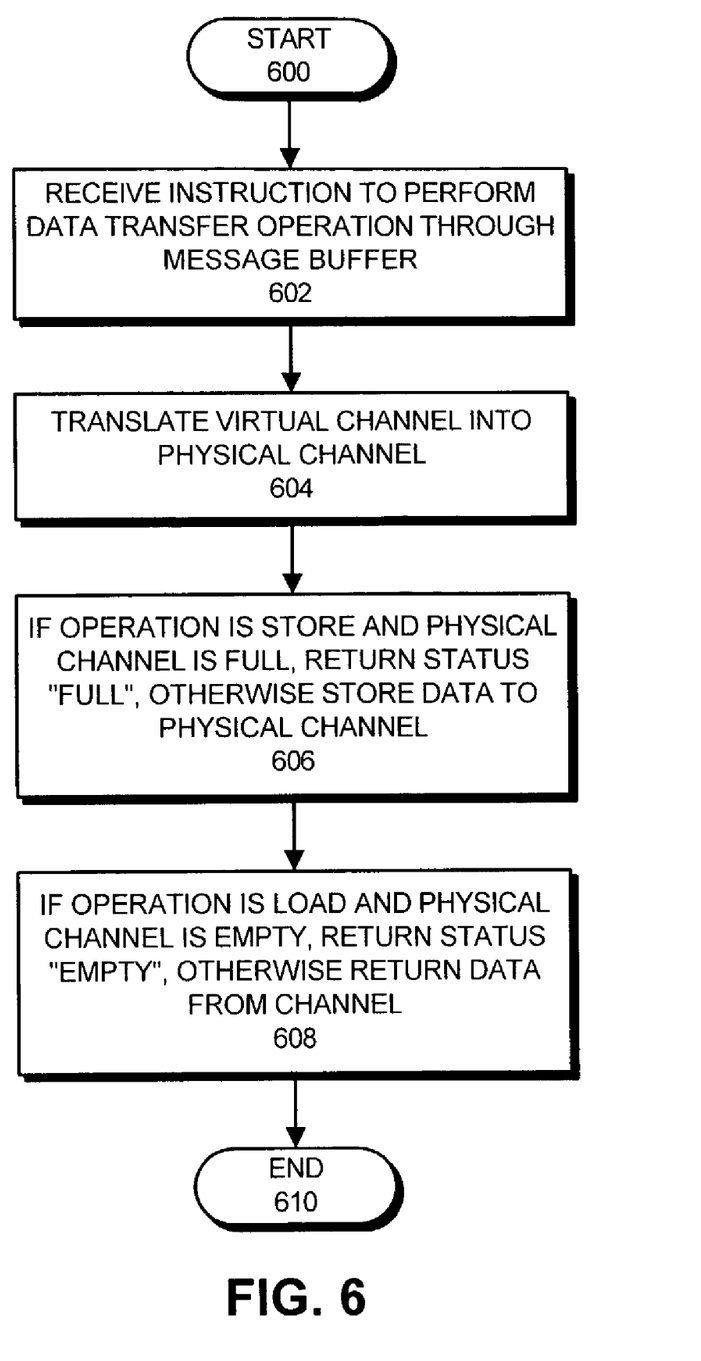
FIG. 6 is a flow chart illustrating the execution of an instruction that operates on the hardware message buffer in accordance with an embodiment of the present invention.

FIG. 6 is a flow chart illustrating the execution of an instruction that accesses the hardware message buffer in accordance with an embodiment of the present invention. The system starts by receiving an instruction to perform a data transfer operation through message buffer 160 (step 602). This instruction includes a virtual channel identifier. In order to execute this instruction, the system first translates the virtual channel identifier into a physical channel identifier by performing a lookup into translation table 202 (step 604).

Next, the system executes the instruction. If the instruction is a store operation, and the physical channel is full, the system cannot perform the store operation and returns status information indicating the physical channel is full. Otherwise, the system stores the data to the physical channel (step 608).

If the operation is a load operation and the physical channel is empty, the system cannot perform the load operation and returns status information indicating that the physical channel is empty. Otherwise, the system returns the data from the physical channel to complete the load operation (step 610).

Note that if the system has not encountered a specific thread/virtual channel combination before, a corresponding physical channel may not have been allocated for the virtual channel. In this case, the system allocates an unused physical channel to accommodate the virtual channel.

Using Channels

Applications can use the above-described channels to synchronize execution between processes running on different processors. For example, a critical section can be implemented by initially placing a token in a channel. A process seeking to gain access to the critical section repeatedly attempts to load the token from the channel. When the process successfully loads the token, it executes the code within the critical section. Upon leaving the critical section, the process stores the token back into the channel to allow another process to access the critical section.

The next example demonstrates another use for virtual channels. This example comes from the SPEC CINT95 benchmark, 129.compress. The pseudo-code illustrated in Table 1 represents the original program segment.

A compiler can determine that memory operations in the procedure output do not have dependencies on memory operations in the global array htab and codetab in the rest of the loop. It can also determine that output uses the local variable ent and the global variable free_ent. Two microthreads can speed this benchmark's execution. The microthreads execute the same program segment as is illustrated in Tables 2 and 3.

TABLE 1

```
for (InCnt = value; InCnt > 0; InCt--) {
    c = {value from buffer, InBuff};
    fcode = f(ent,c);
    i = f(ent,c);
    found = {true if fcode exists in global array htab starting at index i};
    if (found) ent = codetab[{index where found}];
    else {
        output (ent); /* Uses ent and free_ent*/
        ent = c;
        if (free_ent < 65536) {
            codetab[i] = free ent++;
            htab[i] = fcode;
        }
    }
}
```

TABLE 2

Microthread A (Virtual Channel Producer)

```
for (InCnt value; InCnt > 0; InCnt--) {
    c = {value from buffer, InBuff};
    fcode = f(ent,c);
    i = f(ent,c);
    found = {true if fcode exists in global array htab starting at index i };
    if (found) ent = codetab[{index where found}];
    else {
        /* Send ent to µthread B on ent_channel*/
        Send(ent_channel, ent);
        /*Do the same with free_ent*/
        Send(free_ent_channel, free_ent);
        /*Continue to loop iterations while µthread B runs*/
        ent = c;
        if (free_ent < 65536) {
            codetab[i] = free_ent++;
            htab[i] = fcode;
        }else ...
    }
}
flush(ent_channel, free_ent_channel);
done = 1; /*Compiler-introduced variable*/
```

TABLE 3

Microthread B (Virtual Channel Consumer)

```
while (1) {
Label:
    /* Without blocking, receive lcl_ent*/
    /*from µthread A on ent_channel*/
    lcl_status = ReceivedNB(ent_channel, lcl_ent);
    if (done && (lcl_status == 0)) break;
    if (lcl_status == 0) {goto Label};
    output(lcl_ent);
```

TABLE 3-continued

Microthread B (Virtual Channel Consumer)

/*Above procedure contains similar*/
/*Mechanism to receive |c|_free_ent*/
/*from µthread A on free_ent_channel*/
}
/* Finish execution of µthread B*/

The compiler must insert code to pass the values of ent and free_ent from the microthread executing the main loop (Microthread A) to the microthread executing the procedure output (Microthread B) using virtual channels. The virtual channel's producer-consumer synchronization ensues that the conditional execution of Microthread B satisfies Microthread A's control dependency on it (that is, Microthread B's dependency on the value of found), as follows: Microthread B waits for data on a virtual channel, and Microthread A does not send data on a virtual channel unless output, and thus Microthread B, should execute. When the loop is completed, Microthread A notifies Microthread B to end it execution by asserting the complier-introduced variable done. Overall, through virtual channel use, a program that would have executed it $t_1$ seconds can theoretically execute it $t_2$ seconds, where $t_2$ equals $t_1$ minus the time required to execute the procedure output.

The foregoing descriptions of embodiments of the present invention have been presented for purposes of illustration and description only. They are not intended to be exhaustive or to limit the present invention to the forms disclosed. Accordingly, many modifications and variations will be apparent to practitioners skilled in the art. Additionally, the above disclosure is not intended to limit the present invention. The scope of the present invention is defined by the appended claims.

What is claimed is:

1. A method that facilitates inter-processor communication and synchronization through a hardware message buffer, wherein the hardware message buffer includes a plurality of physical channels that are structured as queues for communicating between processors in a multiprocessor system, the method comprising:
    receiving an instruction to perform a data transfer operation through the hardware message buffer;
    wherein the instruction specifies a virtual channel within the hardware message buffer to which the data transfer operation is directed,
    wherein specifying a virtual channel enables program code to be written directly in terms of virtual channels, and wherein the hardware message buffer bypasses cache memory;
    translating the virtual channel into a physical channel within the hardware message buffer; and
    performing the data transfer operation on the physical channel within the hardware message buffer, wherein the hardware message buffer resides outside of the coherent address space of shared memory.

2. The method of claim 1, wherein if the data transfer operation is a store operation and the physical channel is already full, performing the data transfer operation involves returning status information indicating that the physical channel is too full to perform the store operation.

3. The method of claim 1,
    wherein if the data transfer operation is a load operation and the physical channel is empty, performing the data transfer operation involves returning status information indicating that the physical channel is empty and the load operation cannot be completed; and
    wherein if the data transfer operation is a load operation and the physical channel is not empty, performing the data transfer operation involves returning data from the physical channel.

4. The method of claim 1, wherein the hardware message buffer resides within a shared memory that is located outside of a coherent address space of the multiprocessor system.

5. The method of claim 1, wherein translating the virtual channel into a physical channel involves performing a lookup into a translation table that specifies virtual channel-to-physical channel translations.

6. The method of claim 5, wherein each entry in the translation table includes:
    a process/thread identifier;
    a virtual channel identifier;
    a physical channel identifier; and
    a read/write permission indicator.

7. The method of claim 6, wherein each entry in the translation table additionally specifies a number of read operations that must take place before a read pointer is moved, whereby a physical channel can be used to transfer data from a single sender to multiple receivers.

8. The method of claim 5,
    wherein the translation table is a hardware structure that caches entries for recently used virtual channel-to-physical channel translations; and
    wherein less recently used entries are moved from the translation table into memory if necessary.

9. The method of claim 1, wherein each physical channel in the hardware message buffer is structured as a queue and includes a read pointer and write pointer.

10. A method that facilitates inter-processor communication and synchronization through a hardware message buffer, the method comprising:
    receiving an instruction to perform a data transfer operation through the hardware message buffer, wherein the instruction specifies a virtual channel within the hardware message buffer to which the data transfer operation is directed,
    wherein specifying a virtual channel enables program code to be written directly in terms of virtual channels, and wherein the hardware message buffer bypasses cache memory;
    translating the virtual channel into a physical channel within the hardware message buffer;
    performing the data transfer operation through the physical ehannel within the hardware message buffer;
    wherein the hardware message buffer resides outside of the coherent address space of shared memory;
    wherein if the data transfer operation is a load operation and the hardware message buffer is empty, performing the data transfer operation involves returning status information indicating that the hardware message buffer is empty and the load operation cannot be completed; and
    wherein if the data transfer operation is a load operation and the hardware message buffer is not empty, performing the data transfer operation involves returning data from the hardware message buffer.

11. The method of claim 10, wherein if the data transfer operation is a store operation and the hardware message buffer is already full, performing the data transfer operation involves returning status information indicating that the hardware message buffer is too full to perform the store operation.

12. A computer-readable storage medium storing instructions that when executed by a computer cause the computer to perform a method that facilitates inter-processor communication and synchronization through a hardware message buffer, wherein the hardware message buffer includes a plurality of physical channels that are structured as queues for communicating between processors in a multiprocessor system, the method comprising:
- receiving an instruction to perform a data transfer operation through the hardware message buffer;
- wherein the instruction specifies a virtual channel within the hardware message buffer to which the data transfer operation is directed,
- wherein specifying a virtual channel enables program code to be written directly in terms of virtual channels, and wherein the hardware message buffer bypasses cache memory;
- translating the virtual channel into a physical channel within the hardware message buffer; and
- performing the data transfer operation on the physical channel within the hardware message buffer, wherein the hardware message buffer resides outside of the coherent address space of shared memory.

13. The computer-readable storage medium of claim 12, wherein if the data transfer operation is a store operation and the physical channel is already full, performing the data transfer operation involves returning status information indicating that the physical channel is too full to perform the store operation.

14. The computer-readable storage medium of claim 12,
- wherein if the data transfer operation is a load operation and the physical channel is empty, performing the data transfer operation involves returning status information indicating that the physical channel is empty and the load operation cannot be completed; and
- wherein if the data transfer operation is a load operation and the physical channel is not empty, performing the data transfer operation involves returning data from the physical channel.

15. The computer-readable storage medium of claim 12, wherein the hardware message buffer resides within a shared memory that is located outside of a coherent address space of the multiprocessor system.

16. The computer-readable storage medium of claim 12, wherein translating the virtual channel into a physical channel involves performing a lookup into a translation table that specifies virtual channel-to-physical channel translations.

17. The computer-readable storage medium of claim 16, wherein each entry in the translation table includes:
- a process/thread identifier;
- a virtual channel identifier;
- a physical channel identifier; and
- a read/write permission indicator.

18. The computer-readable storage medium of claim 17, wherein each entry in the translation table additionally specifies a number of read operations that must take place before a read pointer is moved, whereby a physical channel can be used to transfer data from a single sender to multiple receivers.

19. The computer-readable storage medium of claim 16,
- wherein the translation table is a hardware structure that caches entries for recently used virtual channel-to-physical channel translations; and
- wherein less recently used entries are moved from the translation table into memory if necessary.

20. The computer-readable storage medium of claim 12, wherein each physical channel in the hardware message buffer is structured as a queue and includes a read pointer and write pointer.

21. A computer-readable storage medium storing instructions that when executed by a computer cause the computer to perform a method that facilitates inter-processor communication and synchronization through a hardware message buffer, the method comprising:
- receiving an instruction to perform a data transfer operation through the hardware message buffer, wherein the instruction specifies a virtual channel within the hardware message buffer to which the data transfer operation is directed,
- wherein specifying a virtual channel enables program code to be written directly in terms of virtual channels, and wherein the hardware message buffer bypasses cache memory;
- translating the virtual channel into a physical channel within the hardware message buffer;
- performing the data transfer operation through the physical channel within the hardware message buffer;
- wherein the hardware message buffer resides outside of the coherent address space of shared memory;
- wherein if the data transfer operation is a load operation and the hardware message buffer is empty, performing the data transfer operation involves returning status information indicating that the hardware message buffer is empty and the load operation cannot be completed; and
- wherein if the data transfer operation is a load operation and the hardware message buffer is not empty, performing the data transfer operation involves returning data from the hardware message buffer.

22. The computer-readable storage medium of claim 21, wherein if the data transfer operation is a store operation and the hardware message buffer is already full, performing the data transfer operation involves returning status information indicating that the hardware message buffer is too full to perform the store operation.

23. An apparatus that facilitates inter-processor communication and synchronization, comprising:
- a multiprocessor system;
- a hardware message buffer within the multiprocessor system;
- wherein the hardware message buffer includes a plurality of physical channels that are structured as queues for communicating between processors in the multiprocessor system, and wherein the hardware message buffer bypasses cache memory;
- an instruction execution mechanism that is configured to receive an instruction to perform a data transfer operation through the hardware message buffer, wherein the instruction specifies a virtual channel within the hardware message buffer to which the data transfer operation is directed
- wherein specifying a virtual channel enables program code to be written directly in terms of virtual channels; and
- a translation mechanism that is configured to translate the virtual channel into a physical channel within the hardware message buffer;
- wherein the hardware message buffer resides outside of the coherent address space of shared memory; and
- wherein the instruction execution mechanism is configured to perform the data transfer operation through the physical channel within the hardware message buffer.

24. The apparatus of claim 23, wherein if the data transfer operation is a store operation and the physical channel is already full, the instruction execution mechanism is configured to return status information indicating that the physical channel is too full to perform the store operation.

25. The apparatus of claim 23,
wherein if the data transfer operation is a load operation and the physical channel is empty, the instruction execution mechanism is configured to return status information indicating that the physical channel is empty and the load operation cannot be completed; and
wherein if the data transfer operation is a load operation and the physical channel is not empty, the instruction execution mechanism is configured to return data from the physical channel.

26. The apparatus of claim 23, wherein the hardware message buffer resides within a shared memory that is located outside of a coherent address space of the multiprocessor system.

27. The apparatus of claim 23, further comprising a translation table within the translation mechanism that specifies virtual channel-to-physical channel translations.

28. The apparatus of claim 27, wherein each entry in the translation table includes:
a process/thread identifier;
a virtual channel identifier;
a physical channel identifier; and
a read/write permission indicator.

29. The apparatus of claim 28, wherein each entry in the translation table additionally specifies a number of read operations that must take place before a read pointer is moved, whereby a physical channel can be used to transfer data from a single sender to multiple receivers.

30. The apparatus of claim 27,
wherein the translation table is a hardware structure that caches entries for recently used virtual channel-to-physical channel translations; and
wherein less recently used entries are moved from the translation table into memory if necessary.

31. The apparatus of claim 23, wherein each physical channel in the hardware message buffer is structured as a queue and includes a read pointer and write pointer.

32. An apparatus that facilitates inter-processor communication and synchronization, the apparatus comprising:
a multiprocessor system;
a hardware message buffer within the multiprocessor system;
an instruction execution mechanism that is configured to receive an instruction to perform a data transfer operation through the hardware message buffer, and to perform the data transfer operation through the physical channel within the hardware message buffer, wherein the instruction specifies a virtual channel within the hardware message buffer to which the data transfer operation is directed,
wherein specifying a virtual channel enables program code to be written directly in terms of virtual channels,
and wherein the hardware message buffer bypasses cache memory;
a translating mechanism that is configured translate to the virtual channel into a physical channel within the hardware message buffer;
wherein the hardware message buffer resides outside of the coherent address space of shared memory;
wherein if the data transfer operation is a load operation and the hardware message buffer is empty, the instruction execution mechanism is configured to return status information indicating that the hardware message buffer is empty and the load operation cannot be completed; and
wherein if the data transfer operation is a load operation and the hardware message buffer is not empty, the instruction execution mechanism is configured to return data from the hardware message buffer.

33. The apparatus of claim 32, wherein if the data transfer operation is a store operation and the hardware message buffer is already full, the instruction execution mechanism is configured to return status information indicating that the hardware message buffer is too full to perform the store operation.

* * * * *